US010712895B2

(12) United States Patent
Jung et al.

(10) Patent No.: US 10,712,895 B2
(45) Date of Patent: Jul. 14, 2020

(54) MOBILE TERMINAL AND CONTROLLING METHOD THEREOF

(71) Applicant: LG ELECTRONICS INC., Seoul (KR)

(72) Inventors: Hyemi Jung, Seoul (KR); Jihee Hong, Seoul (KR); Heonjae Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/217,726

(22) Filed: Jul. 22, 2016

(65) Prior Publication Data
US 2017/0083169 A1  Mar. 23, 2017

(30) Foreign Application Priority Data

Sep. 18, 2015 (KR) .......................... 10-2015-0132190

(51) Int. Cl.
*G06F 3/0481* (2013.01)
*G06F 3/0488* (2013.01)
(Continued)

(52) U.S. Cl.
CPC ............ *G06F 3/0481* (2013.01); *G06F 1/165* (2013.01); *G06F 3/0484* (2013.01);
(Continued)

(58) Field of Classification Search
CPC .............................. G06F 3/0484; G06F 3/0481
See application file for complete search history.

(56) References Cited

U.S. PATENT DOCUMENTS

2008/0158189 A1*  7/2008  Kim .................... G06F 3/04886
                                                                    345/173
2008/0229232 A1  9/2008  Schulz et al.
(Continued)

FOREIGN PATENT DOCUMENTS

CN    103513879    1/2014
CN    104902066    9/2015
(Continued)

OTHER PUBLICATIONS

European Patent Office Application Serial No. 16001572.3, Search Report dated Jan. 2, 2017, 9 pages.
(Continued)

*Primary Examiner* — Andrea C Leggett
(74) *Attorney, Agent, or Firm* — Lee, Hong, Degerman, Kang & Waimey

(57) ABSTRACT

A mobile terminal and controlling method thereof are disclosed. Particularly, disclosed is a method of switching an object displayed on each region in a mobile terminal having a display unit including a first display region and a second display region. The present invention includes a display unit including a first display region and a second display region located on one side of the first display region, a sensing unit, and a controller controlling the display unit and the sensing unit, the controller displays at least one preset object on the second display region, the controller senses a first input signal while an application is run, the controller displays at least one object corresponding to the application on the first display region, the controller displays the at least one object corresponding to the application on the second display region in response to the first input signal.

15 Claims, 9 Drawing Sheets

(51) Int. Cl.
G06F 3/0484 (2013.01)
G06F 1/16 (2006.01)
(52) U.S. Cl.
CPC .. G06F 3/0488 (2013.01); *G06F 2203/04803* (2013.01); *G06F 2203/04804* (2013.01)

(56) References Cited

U.S. PATENT DOCUMENTS

| | | | | |
|---|---|---|---|---|
| 2011/0124376 | A1* | 5/2011 | Kim | G06F 1/1626 |
| | | | | 455/566 |
| 2012/0088548 | A1* | 4/2012 | Yun | G08C 17/02 |
| | | | | 455/557 |
| 2014/0071323 | A1* | 3/2014 | Yi | G06F 3/04883 |
| | | | | 348/333.01 |
| 2016/0219202 | A1* | 7/2016 | Barros | G03B 17/56 |

FOREIGN PATENT DOCUMENTS

| | | |
|---|---|---|
| EP | 2259578 | 12/2010 |
| EP | 2916195 | 9/2015 |
| WO | 2014177753 | 11/2014 |

OTHER PUBLICATIONS

State Intellectual Property Office of the People's Republic of China Application Serial No. 201610828994.5, Office Action dated Dec. 31, 2019, 26 pages.

* cited by examiner

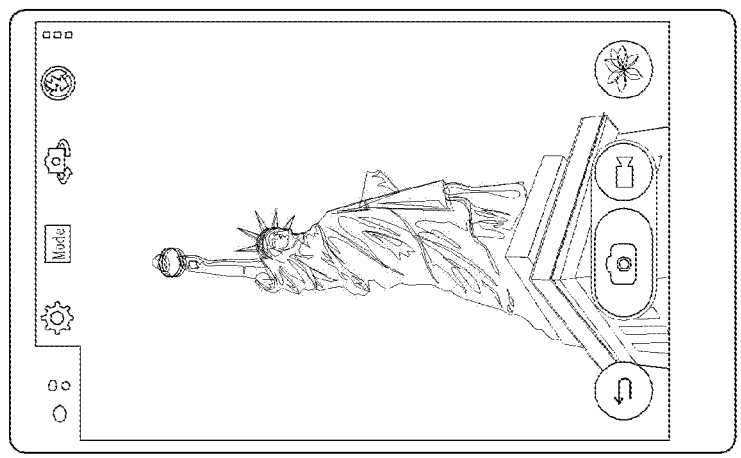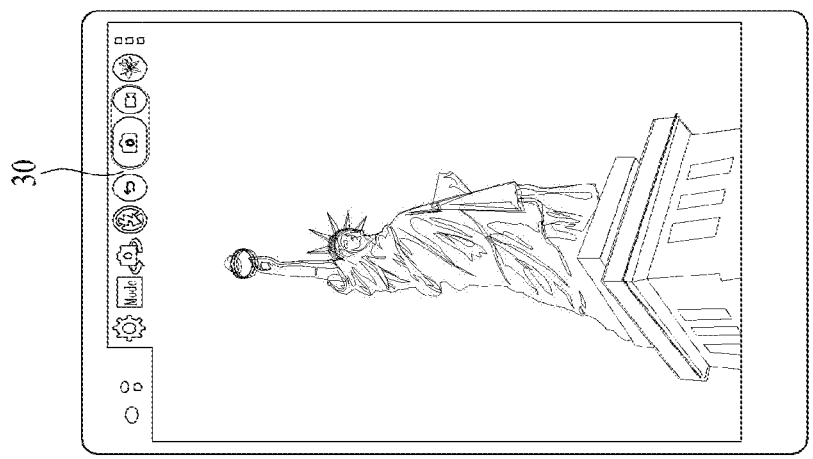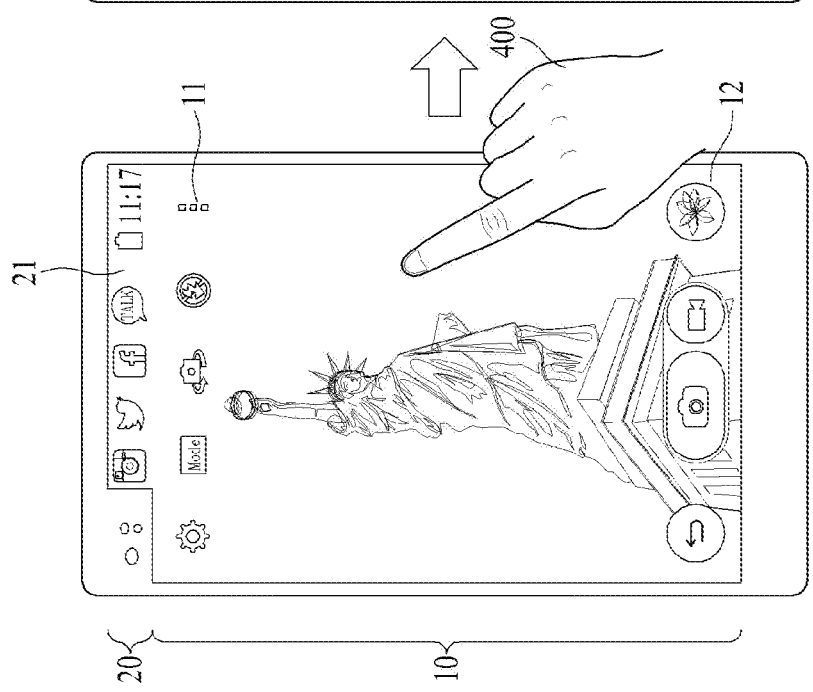

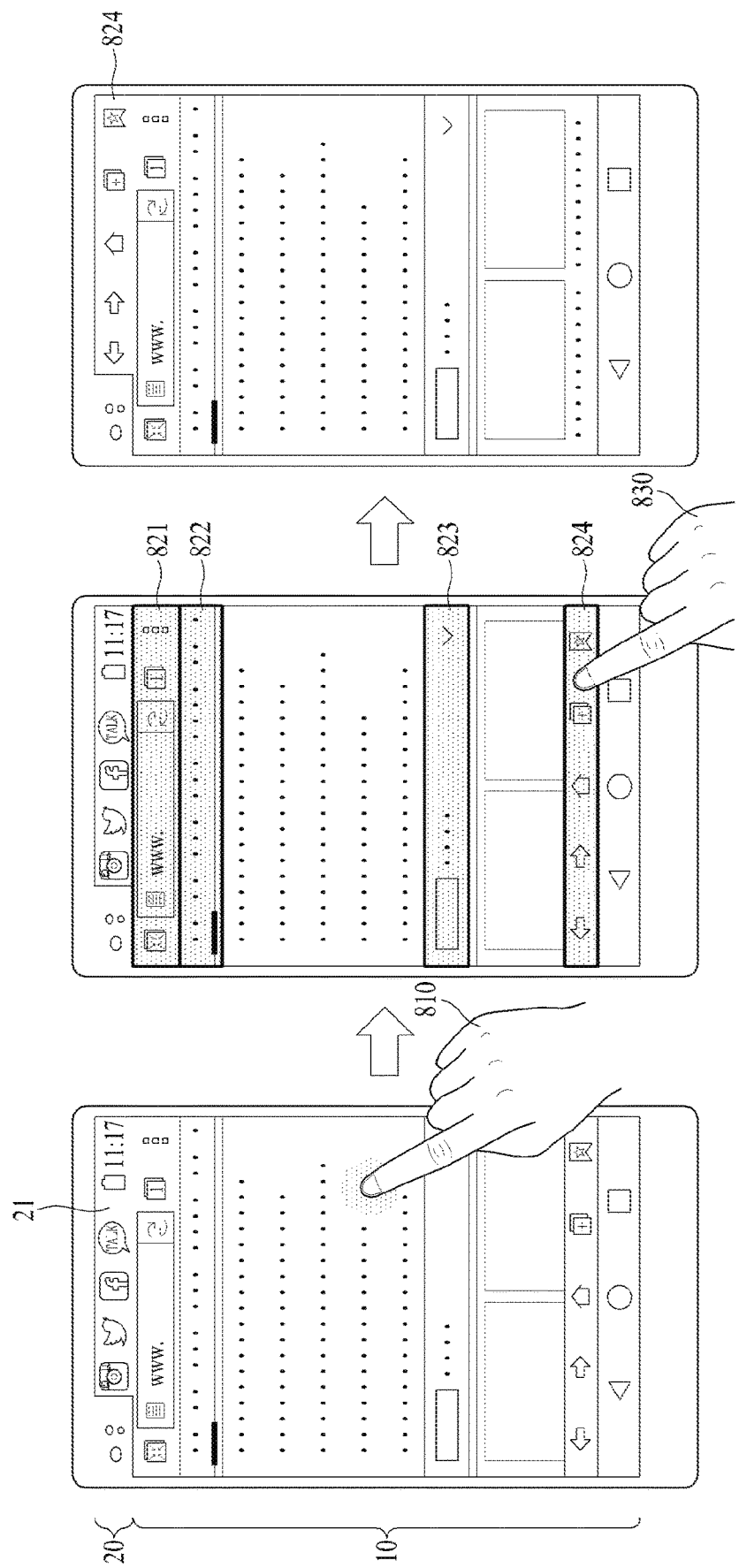

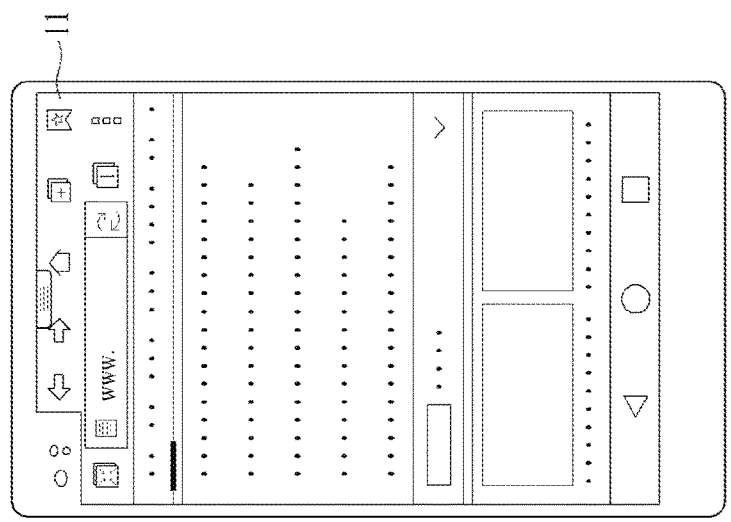
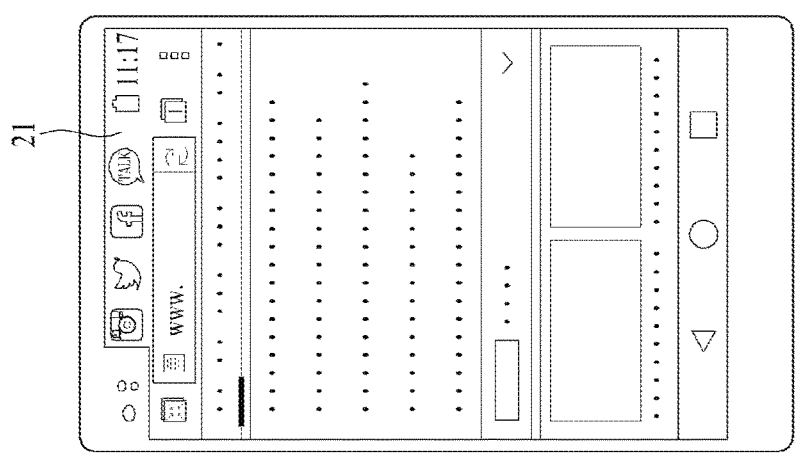
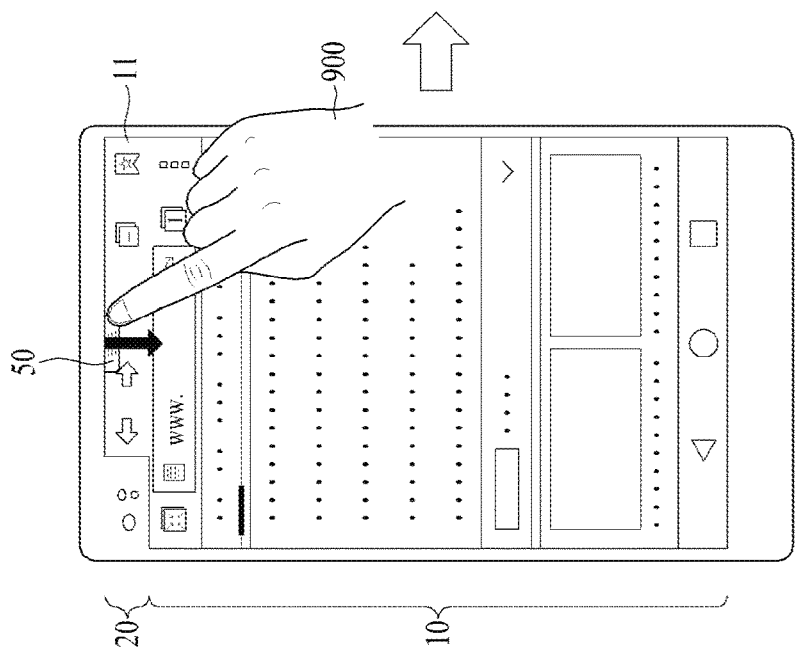

MOBILE TERMINAL AND CONTROLLING METHOD THEREOF

Pursuant to 35 U.S.C. § 119(a), this application claims the benefit of earlier filing date and right of priority to Korean Application No. 10-2015-0132190, filed on Sep. 18, 2015, the contents of which are all incorporated by reference herein in their entirety.

BACKGROUND OF THE INVENTION

Field of the Invention

The present invention relates to a mobile terminal and controlling method thereof, and more particularly, to a method of switching an object displayed on each region in a mobile terminal having a display unit including a first display region and a second display region.

Discussion of the Related Art

A mobile terminal is a device which may be configured to perform various functions. Examples of such functions include data and voice communications, capturing images and video via a camera, recording audio, playing music files and outputting music via a speaker system, and displaying images and video on a display. Some terminals include additional functionality which supports game playing, while other terminals are also configured as multimedia players. More recently, mobile terminals have been configured to receive broadcast and multicast signals which permit viewing of contents, such as videos and television programs.

Generally, terminals can be classified into mobile terminals and stationary terminals according to a presence or non-presence of mobility. And, the mobile terminals can be further classified into handheld terminals and vehicle mount terminals according to availability for hand-carry.

There are ongoing efforts to support and increase the functionality of mobile terminals. Such efforts include software and hardware improvements, as well as changes and improvements in the structural components which form the mobile terminal.

Meanwhile, when a running screen of an application is displayed on a display unit, various objects for controlling a currently run application overlays the running screen. In doing so, however, it may cause a problem of causing inconvenience to a user in using the application. Eventually, the demand for a method for a user to use a running screen of an application efficiently and spaciously is rising.

SUMMARY OF THE INVENTION

Accordingly, embodiments of the present invention are directed to a mobile terminal and controlling method thereof that substantially obviate one or more problems due to limitations and disadvantages of the related art.

One object of the present invention is to provide a mobile terminal and controlling method thereof, by which an object corresponding to an application is not displayed on a running screen of an application used by a user.

Another object of the present invention is to provide a mobile terminal and controlling method thereof, by which an object corresponding to a currently run application is displayed on a region having a running screen of the application not displayed thereon.

Technical tasks obtainable from the present invention are non-limited by the above-mentioned technical tasks. And, other unmentioned technical tasks can be clearly understood from the following description by those having ordinary skill in the technical field to which the present invention pertains.

Additional advantages, objects, and features of the invention will be set forth in the disclosure herein as well as the accompanying drawings. Such aspects may also be appreciated by those skilled in the art based on the disclosure herein.

To achieve these objects and other advantages and in accordance with the purpose of the invention, as embodied and broadly described herein, a mobile terminal according to one embodiment of the present invention may include a display unit including a first display region and a second display region located on one side of the first display region, a sensing unit, and a controller controlling the display unit and the sensing unit, the controller displays at least one preset object on the second display region, the controller senses a first input signal while an application is run, the controller displays at least one object corresponding to the application on the first display region, the controller displays the at least one object corresponding to the application on the second display region in response to the first input signal.

In another aspect of the present invention, as embodied and broadly described herein, a method of controlling a mobile terminal having a display unit including a first display region and a second display region located on one side of the first display region according to another embodiment of the present invention may include the steps of displaying at least one preset object on the second display region, sensing a first input signal while an application is run, displaying at least one object corresponding to the application on the first display region, and displaying the at least one object corresponding to the application on the second display region in response to the first input signal.

In another aspect of the present invention, as embodied and broadly described herein, a mobile terminal according to one embodiment of the present invention may include a display comprising a first display region and a second display region, a sensor, and a controller configured to: execute an application and cause the display to display an execution screen of the executed application; cause the display to display at least one primary object on the first display region and at least one secondary object on the second display region, wherein the at least one primary object corresponds to the executed application; and cause the display to display the at least one primary object on the second display region in response to a first input received via the sensor while the execution screen is displayed.

In another aspect of the present invention, as embodied and broadly described herein, A method of controlling a mobile terminal comprising a display including a first display region and a second display region, the method comprising: executing an application and displaying an execution screen of the executed application; displaying at least one primary object on the first display region and at least one secondary object on the second display region, wherein the at least one primary object corresponds to the executed application; and displaying the at least one primary object on the second display region in response to a first input received via a sensor of the mobile terminal while the execution screen is displayed.

It is to be understood that both the foregoing general description and the following detailed description of the preferred embodiments of the present invention are exemplary and explanatory and are intended to provide further explanation of the invention as claimed.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings, which are given by illustration only, and thus are not limitative of the present invention, and wherein:

FIGS. 4A, 4B and 4C are diagrams for one example of displaying objects on a first display region and a second display region in a mobile terminal according to one embodiment of the present invention;

FIGS. 8A, 8B and 8C are diagrams for one example of selecting a portion of objects corresponding to an application and then display the selected portion on a second display region in a mobile terminal according to one embodiment of the present invention;

FIGS. 9A, 9B and 9C are diagrams for one example of displaying an object on a second display region in a mobile terminal according to one embodiment of the present invention.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the other element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
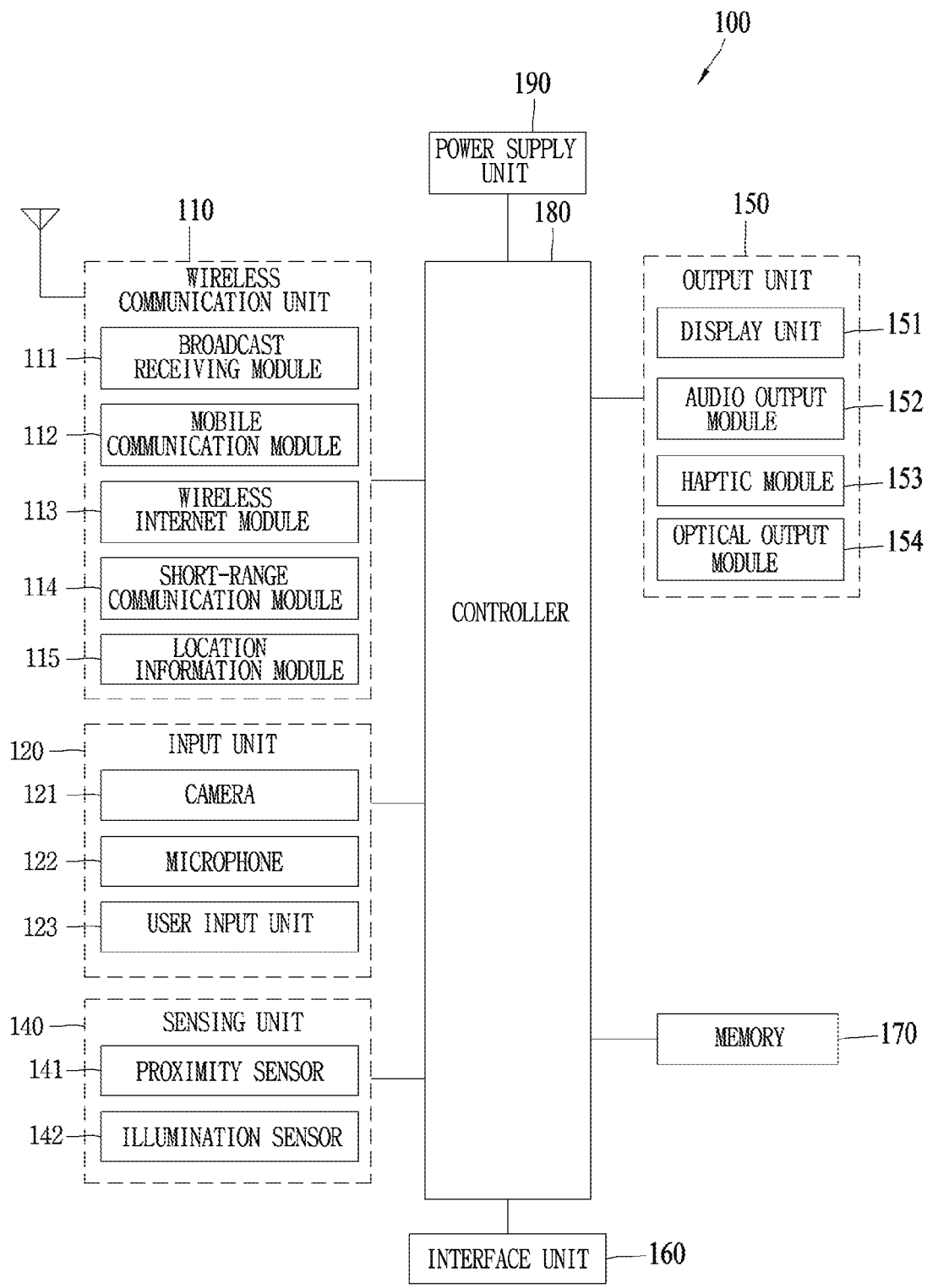
FIG. 1A is a block diagram of a mobile terminal in accordance with the present disclosure.
Figure 1B:
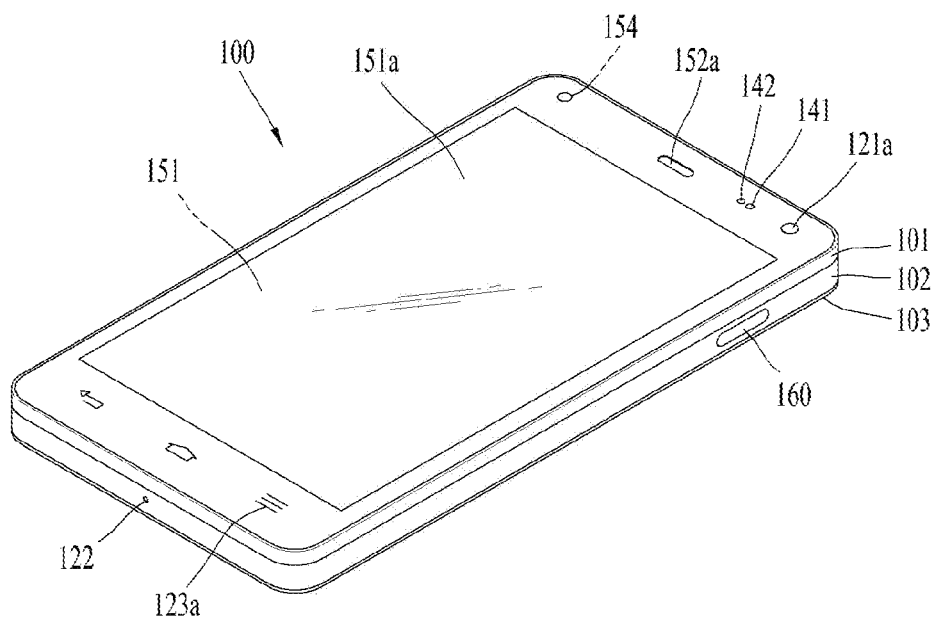
FIGS. 1B and 1C are conceptual views of one example of the mobile terminal, viewed from different directions.
Figure 1C:
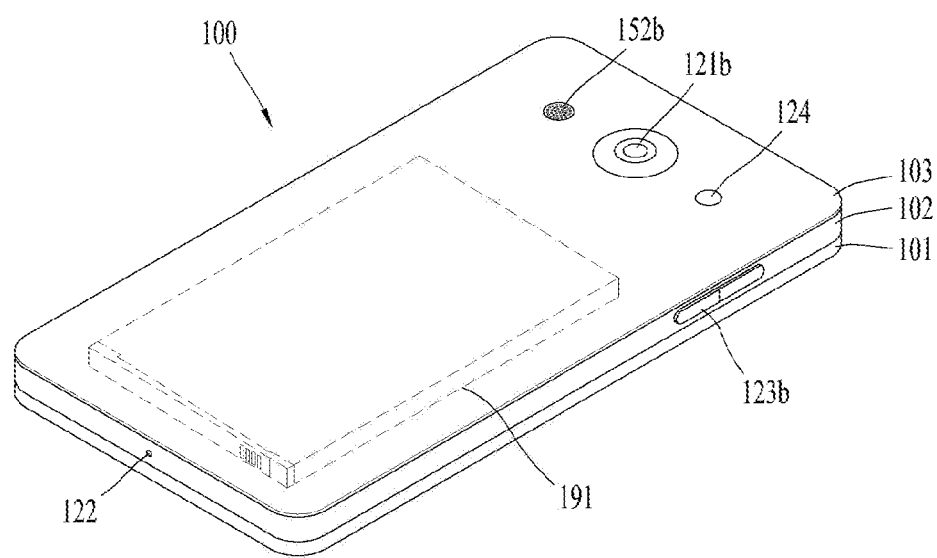

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit 140, an output unit 150, an interface unit 160, a memory 170, a controller 180, and a power supply unit 190. It is understood that implementing all of the illustrated components is not a requirement, and that greater or fewer components may alternatively be implemented. Referring now to FIG. 1A, the mobile terminal 100 is shown having wireless communication unit 110 configured with several commonly implemented components.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server. Further, the wireless communication unit 110 typically includes one or more modules which connect the mobile terminal 100 to one or more networks.

To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by controller 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154. The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the controller 180 to perform an operation (or function) for the mobile terminal 100.

The controller 180 typically functions to control overall operation of the mobile terminal 100, in addition to the operations associated with the application programs. The controller 180 processes signals, data, and informations inputted or outputted through the components mentioned in the foregoing description or runs an application program saved in the memory 170, thereby providing or processing an information or function appropriate for to a user.

The controller 180 may provide or process information or functions appropriate for a user by processing signals, data, information and the like, which are input or output by the various components depicted in FIG. 1A, or activating application programs stored in the memory 170. As one example, the controller 180 controls some or all of the components illustrated in FIG. 1A according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least one portion of the respective components can cooperatively operate to implement operations, controls or controlling methods of a mobile terminal according to various embodiments of the present invention mentioned in the following description. The operations, controls or controlling methods of the mobile terminal can be implemented on the mobile terminal by running at least one application program saved in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The broadcast managing entity may be implemented using a server or system which generates and transmits a broadcast signal and/or broadcast associated information, or a server which receives a pre-generated broadcast signal and/or broadcast associated information, and sends such items to the mobile terminal. The broadcast signal may be implemented using any of a TV broadcast signal, a radio broadcast signal, a data broadcast signal, and combinations thereof, among others. The broadcast signal in some cases may further include a data broadcast signal combined with a TV or radio broadcast signal.

The broadcast signal may be encoded according to any of a variety of technical standards or broadcasting methods (for example, International Organization for Standardization (ISO), International Electrotechnical Commission (IEC), Digital Video Broadcast (DVB), Advanced Television Systems Committee (ATSC), and the like) for transmission and reception of digital broadcast signals. The broadcast receiving module 111 can receive the digital broadcast signals using a method appropriate for the transmission method utilized.

Examples of broadcast associated information may include information associated with a broadcast channel, a broadcast program, a broadcast event, a broadcast service provider, or the like. The broadcast associated information may also be provided via a mobile communication network, and in this case, received by the mobile communication module 112.

The broadcast associated information may be implemented in various formats. For instance, broadcast associated information may include an Electronic Program Guide (EPG) of Digital Multimedia Broadcasting (DMB), an Electronic Service Guide (ESG) of Digital Video Broadcast-Handheld (DVB-H), and the like. Broadcast signals and/or broadcast associated information received via the broadcast receiving module 111 may be stored in a suitable device, such as a memory 170.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal. As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the controller 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The controller 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like).

In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others. As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 may sense which region of the display unit 151 has been touched. Here, the touch controller may be a component separate from the controller 180, the controller 180, and combinations thereof.

In some embodiments, the controller 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

In general, a 3D stereoscopic image may include a left image (e.g., a left eye image) and a right image (e.g., a right eye image). According to how left and right images are combined into a 3D stereoscopic image, a 3D stereoscopic imaging method can be divided into a top-down method in which left and right images are located up and down in a frame, an L-to-R (left-to-right or side by side) method in which left and right images are located left and right in a frame, a checker board method in which fragments of left and right images are located in a tile form, an interlaced method in which left and right images are alternately located by columns or rows, and a time sequential (or frame by frame) method in which left and right images are alternately displayed on a time basis.

Also, as for a 3D thumbnail image, a left image thumbnail and a right image thumbnail can be generated from a left image and a right image of an original image frame, respectively, and then combined to generate a single 3D thumbnail image. In general, the term "thumbnail" may be used to refer to a reduced image or a reduced still image. A generated left image thumbnail and right image thumbnail may be displayed with a horizontal distance difference there between by a depth corresponding to the disparity between the left image and the right image on the screen, thereby providing a stereoscopic space sense.

A left image and a right image required for implementing a 3D stereoscopic image may be displayed on the stereoscopic display unit using a stereoscopic processing unit. The stereoscopic processing unit can receive the 3D image and extract the left image and the right image, or can receive the 2D image and change it into a left image and a right image.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100.

The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 may typically control the general operations of the mobile terminal 100. For example, the controller 180 may set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal.

In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may be equipped with the display unit 151, the first audio output unit 152a, the second audio output unit 152b, the proximity sensor 141, the illumination sensor 142, the optical output unit 154, the first camera 121a, the second camera 121b, the first manipulating unit 123a, the second manipulating unit 123b, the microphone 122, the interface unit 160, and the like.

FIGS. 1B and 1C depict certain components as arranged on the mobile terminal.

However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices.

Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160.

Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In the following description, embodiments related to a controlling method implemented in the above-configured mobile terminal shall be described with reference to the accompanying drawings. It will be appreciated by those skilled in the art that the present invention can be specified into other form(s) without departing from the spirit or scope of the inventions.

Moreover, FIGS. 2 to 10 show a method of displaying a preset object or an object corresponding to an application on a corresponding region in a mobile terminal having a display including a first display region and a second display region.

Regarding the following embodiments shown in FIGS. 2 to 10, operations performed in a mobile terminal can be controlled by the controller 180 shown in FIG. 1A. For clarity of the following description, such operations are commonly depicted and described as performed/controlled by the mobile terminal.

Figure 2:
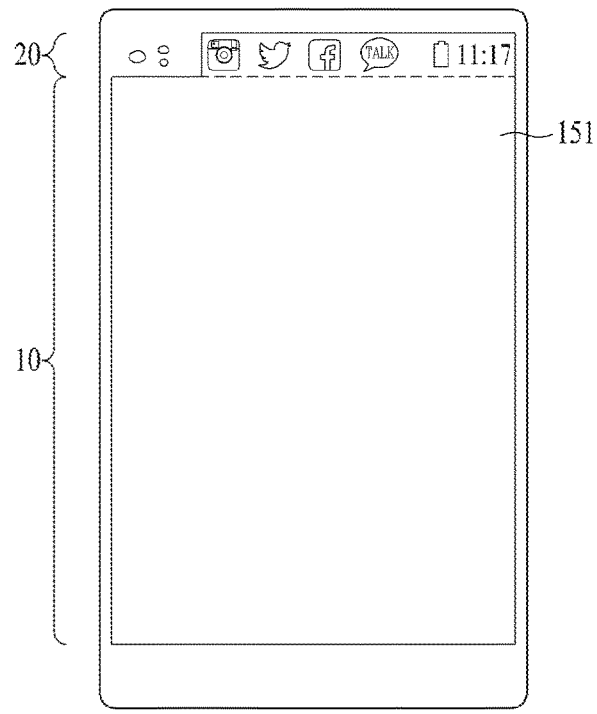
FIG. 2 is a diagram for one example of a display unit of a mobile terminal according to one embodiment of the present invention.

First of all, FIG. 2 and FIG. 3 show a display unit of a mobile terminal according to the present invention. The display unit of the present invention may include a plurality of display regions. And, the display unit may include an LCD (liquid crystal display) panel and a backlight unit.

FIG. 2 is a diagram for one example of a display unit of a mobile terminal according to one embodiment of the present invention. In particular, FIG. 2 shows an LCD panel of the display unit provided to the mobile terminal according to the present invention.

Referring to FIG. 2, the display unit of the present invention can be partitioned into two display regions disposed side by side in a first direction, and more particularly, into a first display region 10 and a second display region 20. The mobile terminal can independently control each of the two display regions. According to the present invention, the first display region 10 may correspond to a main display region and the second display region 20 may correspond to a sub display region.

For instance, the first display region 10 may correspond to a region for outputting general image information and the second display region 20 may correspond to a region for outputting a status bar indicating states of the mobile terminal. For another instance, the first display region 10 may correspond to a region for outputting a running screen of an application and the second display region 20 may correspond to a region for outputting a control screen of the application run on the first display region 10.

The mobile terminal selectively activates one of the two display regions, thereby reducing power consumption. For instance, while the first display region 10 is in deactivated state and the second display region 20 is in activated state, a user can check a status of the mobile terminal and an event occurring in the mobile terminal through the second display region 20.

Meanwhile, referring to FIG. 2, the second display region 20 may be configured in a manner that one of a width and height of the second display region 20 is smaller than that of the first display region 10. And, the second display region 20 may be disposed on one side of the first display region 10. Moreover, the second display region 20 may be formed in a rectangular shape and have a size smaller than that of the first display region 10.

Figure 3A:
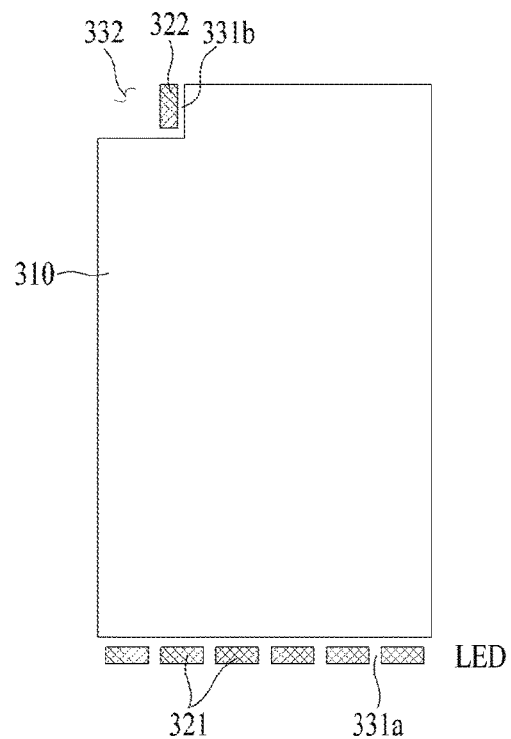
FIGS. 3A and 3B are diagrams for one example of a display unit of a mobile terminal according to one embodiment of the present invention.
Figure 3B:
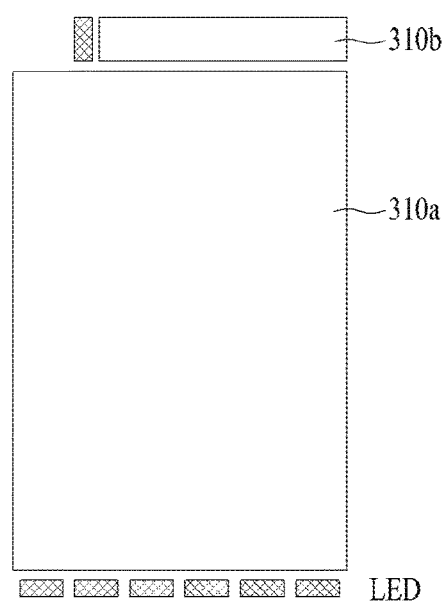

FIGS. 3A and 3B are diagrams for one example of a display unit of a mobile terminal according to one embodiment of the present invention. In particular, FIG. 3 shows a backlight unit of a display unit provided to a mobile terminal according to the present invention.

Referring to FIGS. 3A and 3B, the backlight unit of the mobile terminal may include a light guide plate 310 and light sources 321 and 322. The backlight unit of the present invention may include the light sources supplying light in two directions. The main light source 321 disposed side by side along a first lateral side 331a of the light guide plate 310 can evenly supply light to the whole light guide plate 310. The main light source 321 is spaced apart from the first lateral side 331a. And, a plurality of the main light sources 321 can be provided. The sub light source 322 disposed on a second lateral side 331b of the light guide plate 310 can supply light to a side opposite to the first lateral side 331a on which the main light source 321 is disposed.

The light guide plate 310 may be formed in rectangular shape. Yet, the light guide plate 310 may include a dent 332 recessed concavely from one corner of the light guide plate 310. A lateral side configuring the dent 332, i.e., a lateral side vertical to the first lateral side 331a becomes the second lateral side 331b. And, the light projected from the sub light source 322 is incident on the second lateral side 331b.

The mobile terminal according to the present invention can independently drive the main light source 321 and the sub light source 322. Hence, the mobile terminal can control the main light source 321 or the sub light source 322 to be turned on only.

A plurality of the main light sources 321 may be provided adjacent to the first lateral side 331a side by side, thereby supplying light to the whole light guide plate 310. Yet, one or two sub light sources 322 may be provided less than the main light sources 321, thereby supplying light to a portion of the light guide plate 310.

The light guide plate 310, as shown in FIG. 3, may be provided to the display unit in a manner of being formed in one body or separated. Referring to FIG. 3 A, the light guide plate 310 is formed in one body, thereby receiving the light supplied by the sub light source 322 as well as the light supplied by the main light source 321. Moreover, if the light guide plate 310 is formed in one body, the mobile terminal can output a connected screen to a first display region and a second display region.

Referring to FIG. 3 B, the light guide plate 310 may be provided in separated form and include a first light guide plate 310a projecting the light supplied by the main light source 321 toward a front surface of the display unit and a second light guide plate 310b projecting the light supplied by the sub light source 322 toward the front surface of the display unit. In this case, the light of the main light source 321 is supplied to the first display region through the first light guide plate 310a only, while the light of the sub light source 322 is supplied to the second display region through the second light guide plate 310b only.

A method of displaying an object on a second display region in accordance with a switch mode set in a mobile terminal is described as follows. The switch mode set in the mobile terminal may include an auto mode and a manual mode. In accordance with the set switch mode, a user can use an object displayed on the second display region.

In the following, FIGS. 4 to 6 show a method of displaying a running screen of an application and an object for controlling the application using the aforementioned first and second display regions. In particular, FIGS. 4 to 6 correspond to an auto mode in which an object is automatically set to be displayed on the second display region.

FIGS. 4A, 4B and 4C are diagrams for one example of displaying objects on a first display region and a second display region in a mobile terminal according to one embodiment of the present invention.

Referring to FIG. 4A, a mobile terminal can display at least one preset object 21 on the second display region 20 no matter whether an application is run or not. In particular, if the second display region 20 is activated, the mobile terminal can display a preset object 21. In this case, the preset object may include one of an object indicating a state of the mobile terminal, an object indicating an event occurring in the mobile terminal, an object corresponding to a preset application, and the like.

For instance, the object indicating the state of the mobile terminal may include one of a battery object, a time object, a Wi-Fi object, and the like. For instance, the object indicating the event occurring in the mobile terminal may include one of a message object, a phone object, an SNS object, and the like. For instance, the object corresponding to the preset application may correspond to an object indicating one of various applications set by a user.

Meanwhile, the preset object 21 may include a plurality of objects but may not be displayed on the second display region 20 simultaneously. In doing so, if an input signal of scrolling in a left or right direction, the mobile terminal may display an object, which fails to be displayed among a plurality of the objects included in the preset object 21, on the second display region 20.

Moreover, the mobile terminal can sense an input signal (not shown in the drawing) for running an application. For instance, the input signal (not shown in the drawing) may correspond to a signal for selecting an application displayed on a home screen. According to an embodiment shown in FIG. 4, assume that the input signal sensed application is a camera application. According to the present invention, applications to be run may include a third party application as well as an application autonomously provided to the mobile terminal.

If so, the mobile terminal can display a running screen of the application on the first display region 10. According to an embodiment shown in FIG. 4 A, the running screen of the application may correspond to a preview image sensed by the camera. In doing so, the mobile terminal can display at least one or more objects 11 and 12 corresponding to the application on the first display region 10 [Normal view]. For instance, the at least one object corresponding to the application may include a menu icon for controlling the application. According to an embodiment shown in FIG. 4, the object corresponding to the application may correspond to a menu icon for taking an image or video on the camera application.

Moreover, the mobile terminal may display a menu icon (not shown in the drawing) for controlling the mobile terminal on the first display region 10 as well as the objects 11 and 12 corresponding to the application. For instance, the menu icon (not shown in the drawing) for controlling the mobile terminal may include one of a home screen icon, a previous screen icon, a menu icon and the like.

Subsequently, the mobile terminal can sense an input signal 400 for the first display region 10. For instance, the input signal 400 may correspond to one of a short touch input and a long touch input. For another instance, the input signal 400 may include one of a drag touch input in continuation with a long touch input and a flicking touch input.

If so, in response to the input signal 400, the mobile terminal can display a preset switch object, which is selected from the at least one or more objects 11 and 12 corresponding to the application, on the second display region 20 in a manner of moving the preset switch object from the first display region 10 to the second display region 20 [Clean view]. For instance, the preset switch object may correspond to all or portion of the at least one or more objects corresponding to the application.

Referring to FIG. 4 B, in response to the input signal 400, the mobile terminal can display all the objects 11 and 12 corresponding to the application on the second display region 20 by moving the objects 11 and 12 from the first display region 10 to the second display region 20. Hence, the mobile terminal can display the running screen of the application on the first display region 10 only. Through this, a user can use the running screen of the application as wide as possible. Moreover, according to the embodiment shown in FIG. 4 B, a user can recognize an image sensed by the camera as a wider and larger image.

On the other hand, in response to the input signal 400, the mobile terminal can display a portion of the at least one or more objects 11 and 12 corresponding to the application on the second display region 20 by moving the portion to the second display region 20 from the first display region 10. In particular, referring to FIG. 4 C, in response to the input signal 400, the mobile terminal may move the first object 11 included in the objects corresponding to the application to the second display region 20 only but may control the second object 12 to be still displayed on the first display region 10.

In doing so, referring to FIG. 4 B and FIG. 4 C, in response to the input signal 400, the mobile terminal can remove the preset object 21 displayed on the second display region 20. Yet, if an additional input signal (not shown in the drawing) is sensed, the mobile terminal can re-display the preset object 21 on the second display region 20. This will be described in detail with reference to FIG. 9 later.

Meanwhile, in case of the camera application in the description of the embodiment shown in FIG. 4, through an input signal for the first display region 10 in the clean view state, a focus on an image is adjusted and the image can be taken. Besides, if a short touch input to the first display region 10 having a preview image displayed thereon only is sensed, the mobile terminal can adjust the focus on a short touch input sensed position [not shown in FIG. 4]. Moreover, if a long touch input to the first display region 10 is sensed, the mobile terminal can capture an image. This is non-limited by the above-described embodiment but can be implemented diversely.

Besides, in the state shown in FIG. 4 B and FIG. 4 C, the mobile terminal can sense an input signal (not shown in the drawing) for the second display region 20 [not shown in FIG. 4]. For instance, the input signal (not shown in the drawing) may correspond to a drag touch input or a long touch input. If so, in response to the input signal (not shown in the drawing), the mobile terminal can display the preset switch object on the first display region 10 again by moving the preset switch object from the second display region 20 to the first display region 10. In doing so, the mobile terminal can re-display at least one preset object 21 on the second display region 20.

Figure 5A:
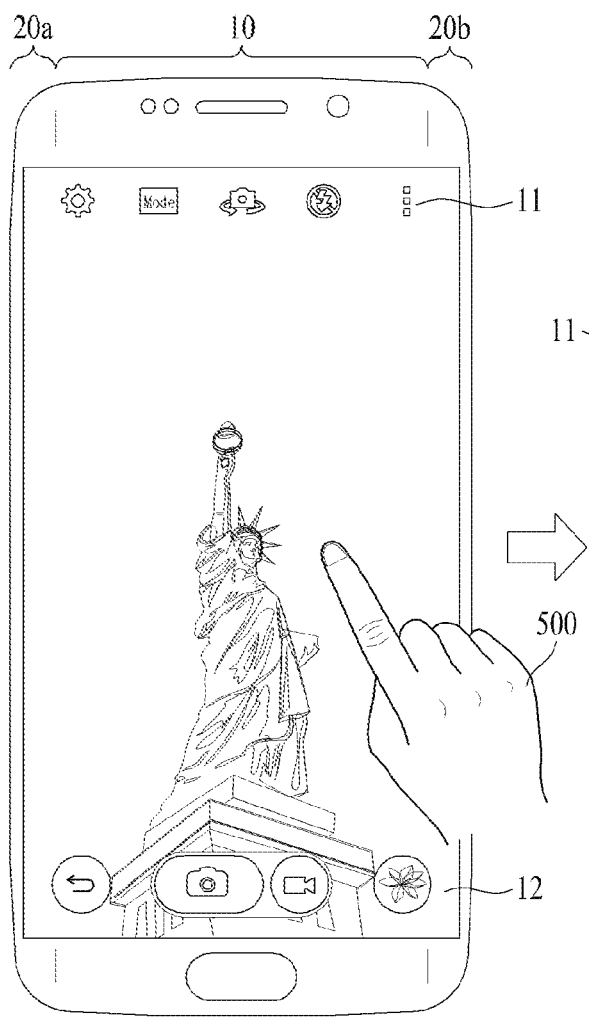
FIGS. 5A and 5B are diagrams for one example of displaying objects on a first display region and a second display region in a mobile terminal according to one embodiment of the present invention.
Figure 5B:
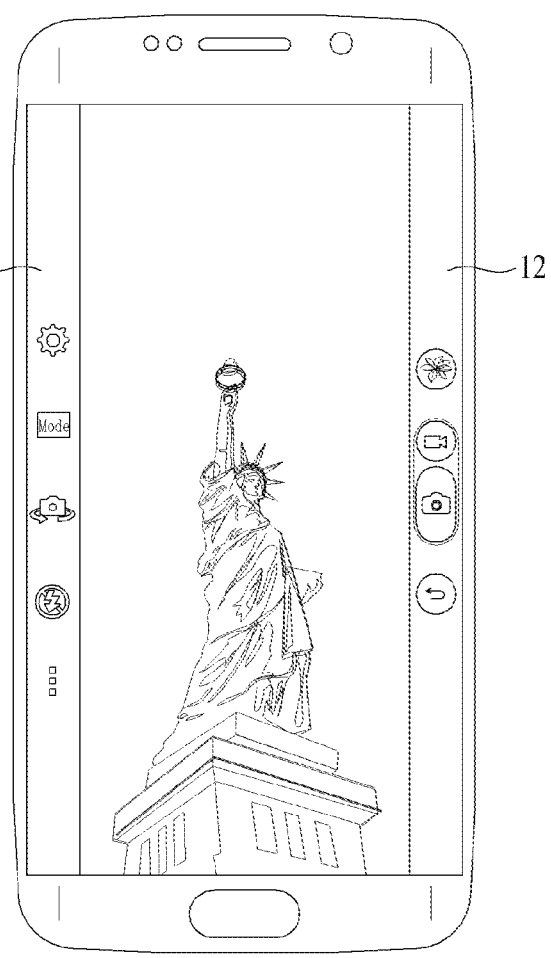

FIGS. 5A and 5B are diagrams for one example of displaying objects on a first display region and a second display region in a mobile terminal according to one embodiment of the present invention. Substance redundant with the former description with reference to FIG. 4 shall be omitted from the following description with reference to FIG. 5.

Regarding the embodiment shown in FIG. 5, second display regions 20a and 20b may be situated on both sides of a first display region 10 with reference to the time in which the mobile terminal is used in portrait mode, respectively. In this case, the portrait mode may correspond to a mode used in a state that a length of the display unit of the mobile terminal is greater than a width of the display unit. According to the embodiment shown in FIG. 5, the second display regions 20a and 20b may be situated not on a front side of the mobile terminal but on a lateral side of the mobile terminal.

Referring to FIG. 5 A, the mobile terminal can display a running screen of an application and at least one or more objects 11 and 12 corresponding to the application on the first display region 10 [Normal view]. In doing so, the mobile terminal can sense an input signal 500 for the first display region 10. For instance, the input signal 500 may include one of a short touch input, a drag touch input, a flicking touch input and the like.

Subsequently, referring to FIG. 5 B, in response to the input signal 500, the mobile terminal can display the at least one or more objects 11 and 12 on the second display regions 20a and 20b [Clean view]. For instance, the mobile terminal displays the first object 11 on the second display region 20a and is also able to display the second object 12 on the second display region 20b. Yet, the positions for displaying the first and second objects 11 and 12 corresponding to the application are non-limited by this.

Figure 6A:
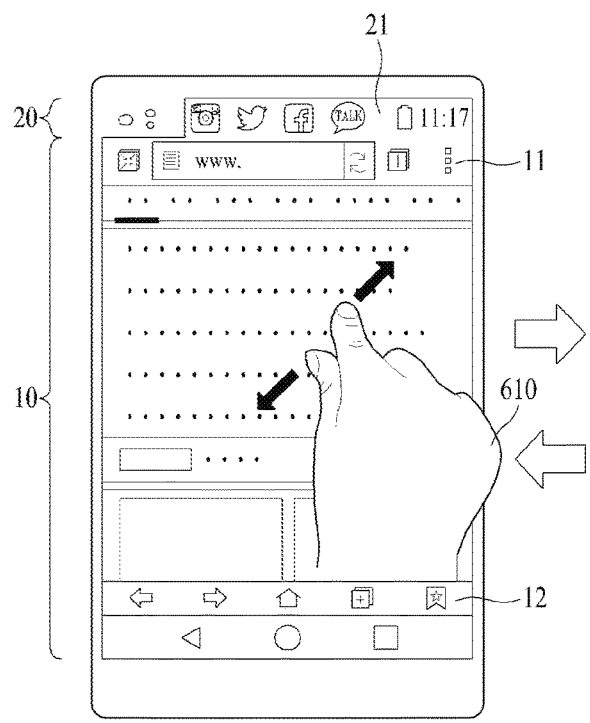
FIGS. 6A and 6B are diagrams for one example of displaying objects on a first display region and a second display region in a mobile terminal according to one embodiment of the present invention.
Figure 6B:
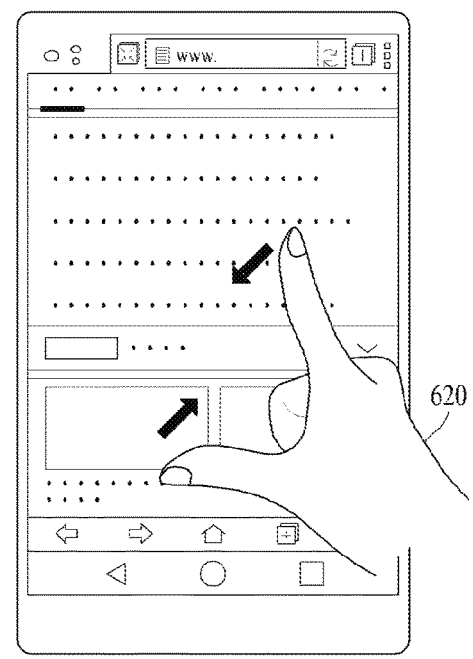

FIGS. 6A and 6B are diagrams for one example of displaying objects on a first display region and a second display region in a mobile terminal according to one embodiment of the present invention. Substance redundant with the former description with reference to FIG. 4 shall be omitted from the following description with reference to FIG. 6.

Referring to FIG. 6 A, while an application is run, the mobile terminal displays a running screen of the application on a first region 10 and is also able to display at least one preset object 21 on a second display region 20. Moreover, the mobile terminal can simultaneously display at least one or more objects 11 and 12 corresponding to the application on the first region 10 together with the running screen of the application.

In doing so, the objects 11 and 12 corresponding to the application may correspond to objects maintained constantly despite that the running screen of the application is changed. According to the example shown in FIG. 6, the run application is a search application, the object 11 corresponding to the application may correspond to a search window, and the object 12 corresponding to the application may include a back icon, a forward icon, a home screen icon, a bookmark icon, and the like.

In doing so, the mobile terminal can sense an input signal 610 for the first display region 10. For instance, the input signal 610 may correspond to a pinch-out touch input.

In this case, the mobile terminal can display a preset object among the objects corresponding to the application, which are displayed on the first display region 10, on the second display region 20 by moving the preset object to the second display region 20. In particular, the object moved to the second display region 20 may correspond to an object preset by a user or an object preset on the application autonomously. For instance, the preset object may correspond one of an object occupying a largest region, an object situated on a top end portion, an object situated on a bottom end portion, and the like.

In particular, referring to FIG. 6 B, in response to the first input signal 610, the mobile terminal can display the search window object 11 among the objects corresponding to the application on the second display region 20. Yet, unlike FIG. 6 B, in response to the first input signal 610, the mobile terminal can display the object 12, which corresponds to the menu icon among the objects corresponding to the application, on the second display region 20. Besides, in response to the first input signal 610, the mobile terminal may display all the objects corresponding to the application on the second display region 20 [not shown in FIG. 6 B].

Meanwhile, while the object corresponding to the application is displayed on the second display region 20, the mobile terminal can sense a second input signal 620. In this case, the second input signal 620 may correspond to a pinch-in touch input.

If so, like the example shown in FIG. 6 A, the mobile terminal can re-display the object corresponding to the application, which is displayed on the second display region 20, on the first display region 10. Hence, the mobile terminal can display the preset object 21 on the second display region 20.

Through the above-described embodiment, a user can use the running screen of the application, which is displayed on the first display region, more widely through the pinch-in touch input and the pinch-out touch input.

Unlike the above-described embodiment, FIG. 7 and FIG. 8 correspond to a manual mode for a user to select an object to display on a second display region.

Figure 7A:
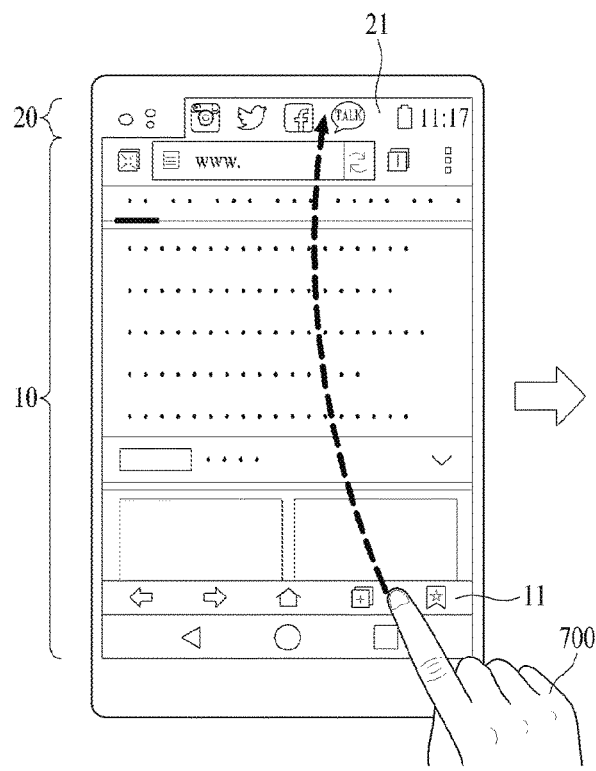
FIGS. 7A and 7B are diagrams for one example of selecting a portion of objects corresponding to an application and then display the selected portion on a second display region in a mobile terminal according to one embodiment of the present invention.
Figure 7B:
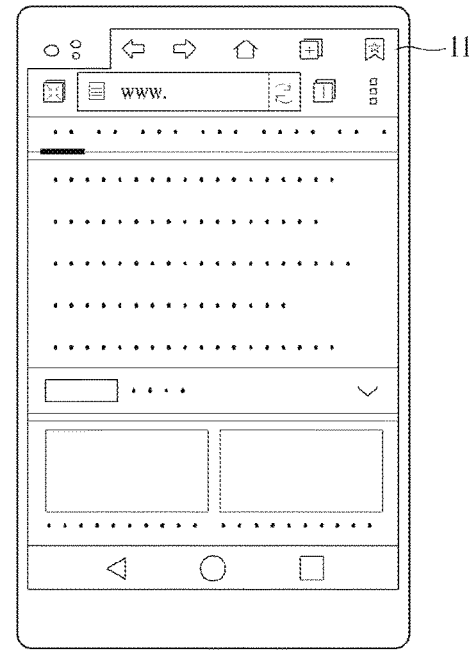

FIGS. 7A and 7B are diagrams for one example of selecting a portion of objects corresponding to an application and then display the selected portion on a second display region in a mobile terminal according to one embodiment of the present invention.

Referring to FIG. 7, while an application is run, the mobile terminal displays a running screen of the application on a first region 10 and is also able to display at least one preset object 21 on a second display region 20.

In doing so, referring to FIG. 7 A, the mobile terminal can sense an input signal 700 for the first display region 10. For instance, the input signal 700 may include one of a drag touch input and a flicking touch input. The input signal 700 may correspond to an input ending to the second display region 20 by starting from the first display region 10. And, the region, from which the input signal 700 starts, may correspond to a region including an object 11 corresponding to the currently run application in the first display region.

If so, referring to FIG. 7 B, in response to the input signal 700, the mobile terminal can display the object 11 corresponding to the application on the second display region 20. Moreover, in doing so, in response to the input signal 700, the mobile terminal can remove the preset object 21 previously displayed on the second display region 20.

Besides, if the input signal 700 starts from the search window object displayed on the first display region 10, the mobile terminal may display the search window object on the second display region 20.

FIGS. 8A, 8B and 8C are diagrams for one example of selecting a portion of objects corresponding to an application and then display the selected portion on a second display region in a mobile terminal according to one embodiment of the present invention.

Referring to FIG. 8, while an application is run, the mobile terminal displays a running screen of the application on a first region 10 and is also able to display at least one preset object 21 on a second display region 20.

In doing so, referring to FIG. 8 A, the mobile terminal can sense an input signal 810 for the first display region 10. For instance, the input signal 810 may include a long touch input. And, a position from which the first input signal 810 is sensed may correspond to a region on which such a content as a text, an image or the like is not displayed in the running screen of the application. Yet, a type of the first input signal 810 or the sensed position of the first input signal 810 may be non-limited by the above description but can include various types of input signals or various sensed positions.

If so, referring to FIG. 8 B, the mobile terminal can display separate indicators 821 to 824 on the running screen of the application. In this case, each of the separate indicators 821 to 824 can indicate a region displayable independently by being separated from the running screen of the application. And, a region for displaying each of the separate indicators 821 to 824 may correspond to one of a region having no change in accordance with a use of the application, a region requiring a real-time update, a region including a menu icon necessary for a use of the application, and the like.

Each of the separate indicators 821 to 824 may include a graphic effect represented in various colors. Through this, a user can recognize an object switchable to the second display region 20 easily and conveniently.

Subsequently, the mobile terminal can sense a second input signal 830 for the region on which each of the separate indicators 821 to 824 is displayed. For instance, the second input signal 830 may correspond to a short touch input, by which types of the second input signal 830 may be non-limited. According to the example shown in FIG. 8 B, the mobile terminal can sense a short touch input to the region 824 on which menu icons required for using the application are displayed.

If so, the mobile terminal moves the object displayed on the region from which the second input signal 830 is sensed to the second display region 20 and is then able to display the moved object on the second display region 20. Referring to FIG. 8 C, the mobile terminal can display the menu icon displayed region 824 on the second display region 20. Hence, the mobile terminal can remove the existing preset object 21 from the second display region 20. As the menu icon displayed region 824 has moved into the second display region 20, a user can use the running screen of the application on the first display region 10 more widely.

FIGS. 9A, 9B and 9C are diagrams for one example of displaying an object on a second display region in a mobile terminal according to one embodiment of the present invention.

Referring to FIG. 9 A, the mobile terminal displays a running screen of an application on a first display region 10 and is also able to display an object 11 corresponding to the application on a second display region 20. In doing so, the mobile terminal can display a visual cue 50 indicating a presence of a preset object 21.

While a user uses the running screen of the application displayed on the first display region 10, it may happen that the user intends to use a menu included in the preset object 21. In doing so, the mobile terminal can sense a first input signal 900 for the visual cue 50. In particular, the first input signal 810 may correspond to a drag or flicking touch input in a bottom direction.

If so, referring to FIG. 9 B, in response to the first input signal 900, the mobile terminal can display at least one preset object 21 on the second display region 20. For instance, in response to the drag touch input of the first input signal 900, the mobile terminal can display the at least one preset object 21 in a manner of controlling the preset object 21 to slide from a top end to a bottom end of the second display region 20.

Thereafter, referring to FIG. 9 C, after the preset object 21 has been displayed on the second display region 20, if a preset time expires, the mobile terminal removes the preset object 21 from the second display region 20 and is able to display the object 11 corresponding to the application on the second display region 20. For instance, the preset time may correspond to 10 seconds, by which the preset time is non-limited.

Besides, while the at least one preset object 21 is displayed on the second display region 20, the mobile terminal may sense a second input signal (not shown in the drawing) [not shown in FIG. 9]. In particular, the second input signal (not shown in the drawing) may correspond to a drag or flicking touch in a direction opposite to that of the first input signal 900 mentioned in the foregoing description. If so, in response to the second input signal (not shown in the drawing), the mobile terminal removes the at least one preset object 21 in a manner of controlling the object 21 to slide in a top direction and is able to display the object 11 corresponding to the application on the second display region 20.

Figure 10:
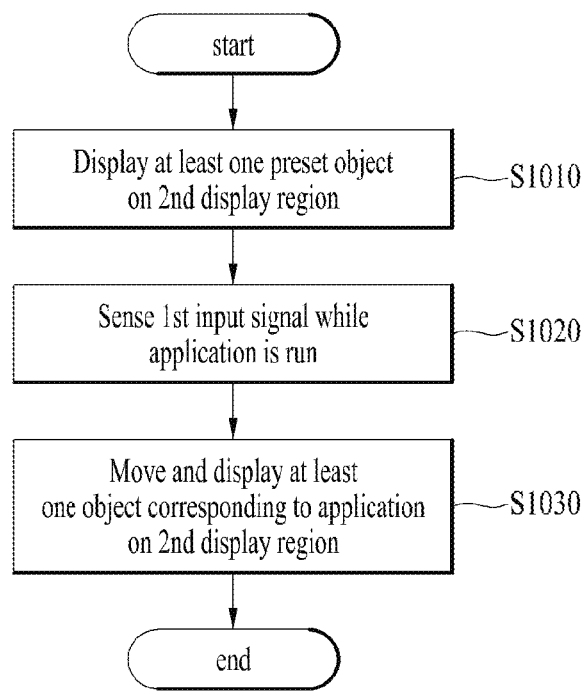
FIG. 10 is a diagram for a method of controlling a mobile terminal according to one embodiment of the present invention.

FIG. 10 is a diagram for a method of controlling a mobile terminal according to one embodiment of the present invention. In particular, the respective steps described with reference to FIG. 10 in the following can be controlled by the controller of the mobile terminal shown in FIG. 1.

Referring to FIG. 10, the mobile terminal can display at least one preset object on a second display region [S1010]. As mentioned in the foregoing description with reference to FIG. 4, if the second display region is in an activated state, the mobile terminal can display the at least one preset object on the second display region no matter whether an application is activated or not.

Subsequently, while the application is run, the mobile terminal can sense a first input signal [S1020]. In doing so, the mobile terminal displays a running screen of the application on a first display region and is also able to display at least one object corresponding to the application. For instance, the at least one object corresponding to the application may correspond to a menu icon for controlling the application.

Thereafter, in response to the first input signal, the mobile terminal moves the at least one object corresponding to the application into the second display region and is then able to display the moved at least one object on the second display region [S1030]. In doing so, the mobile terminal can remove the at least one preset object displayed on the second display region.

Various embodiments may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

What is claimed is:

1. A mobile terminal, comprising:
a display comprising a first display region and a second display region adjacent to the first display region;
a camera:
a sensor; and
a controller configured to:
execute an application and cause the display to display an execution screen of the executed application in the first display region, wherein the execution screen comprises input menus and a content screen and the input menus are displayed to be overlapped on the content screen;
wherein the executed application is a camera application; the input menus comprise: a menu icon for capturing an image or video, a photo album icon, and a settings icon: and the content screen is a preview image of the camera application;
move at least one icon of the displayed input menus from the first display region to the second display region in response to a first input received via the sensor while the execution screen is displayed,
cause the camera to adjust a focus when a short touch input to the preview image is received via the sensor after the at least one icon is moved;
capture an image via the camera when a long touch input to the preview image is received via the sensor after the at least one icon is moved;
cause the first display region to display the content screen in response to the first input received via the sensor; and
cause the second display region to display the input menus in response to the first input received via the sensor.

2. The mobile terminal of claim 1, wherein the input menus further comprise a home screen icon and a previous screen icon.

3. The mobile terminal of claim 1, wherein the first input includes a short touch input, a long touch input, a drag touch input, or a flicking touch input.

4. The mobile terminal of claim 1, wherein the at least one icon corresponds to all icons of the displayed input menus displayed in the first display region.

5. The mobile terminal of claim 1, wherein the controller is further configured to move the at least one icon from the second display region back to the first display region in response to an additional touch input received via the sensor after the at least one icon is moved.

6. The mobile terminal of claim 1, wherein the second input is received on the first display region.

7. The mobile terminal of claim 6, wherein the second input is received on an area of the first display region in which no text or image related to the executed application is displayed.

8. The mobile terminal of claim 1, wherein the controller is further configured to: cause the display to display at least one primary object in the first display region and at least one secondary object in the second display region;
cause the display to display a separate indicator on each of the at least one primary object in response to a second input, wherein the separate indicator indicates that each of the at least one primary object is displayable independently by being separated from the execution screen displayed in the first display region.

9. The mobile terminal of claim 8, wherein separate indicators for different primary objects of the at least one primary object include different graphic effects to be distinguishable from one another.

10. The mobile terminal of claim 9, wherein the different graphic effects are presented in various colors.

11. The mobile terminal of claim 8, wherein the controller is further configured to cause the display to display a primary object selected from the at least one primary object in the second display region in response to a third input, which is received via the sensor while the execution screen is displayed in the first display region, such that the at least one secondary object is no longer displayed in the second display region, wherein the third input is received after the second input is received, wherein the second input is a long touch input and the third input is a short touch input.

12. The mobile terminal of claim 11, wherein the third input is received on one of the at least one primary object displayed in the first display region to select the primary object.

13. The mobile terminal of claim 1, wherein a size of the first display region is larger than a size of the second display region.

14. The mobile terminal of claim 1, wherein the first input comprises a drag touch input or a flicking touch input.

15. The mobile terminal of claim 14, wherein the first input starts from the first display region and ends at the second display region.

* * * * *